UNITED STATES PATENT OFFICE.

JOHN J. AUBERTIN, JR., OF ST. LOUIS, MISSOURI.

SOLDER FOR ALUMINUM.

1,256,285.      Specification of Letters Patent.      Patented Feb. 12, 1918.

No Drawing.      Application filed October 15, 1917. Serial No. 196,594.

*To all whom it may concern:*

Be it known that I, JOHN J. AUBERTIN, Jr., a citizen of the United States, residing at the city of St. Louis, in the State of Missouri, have invented certain new and useful Improvements in Solder for Aluminum, of which the following is a specification.

This invention consists in an improvement in solders for uniting aluminum, and can be used not only for uniting two parts both made of aluminum but, also, two parts one of which is aluminum and the other of some other material, as for instance, brass or copper.

Attempts have heretofore been made to produce a solder for joining aluminum parts, but the results have not been satisfactory. Moreover, in using prior aluminum solders it has been necessary to soak in a suitable pickle the parts to be joined, which takes much time and delays the soldering process, besides involving the cost of the pickling material. In some instances the parts to be joined by such prior solders have been painted with a suitable acid preparatory to soldering.

In the use of the invention forming the subject-matter hereof the parts do not need to be prepared by either pickling or the use of acid. All that is necessary is that the adjoining ends or edges or parts shall be scraped clean with a suitable knife or scraper; but the use of sandpaper or any kind of acid is to be avoided.

In using prior solders for aluminum it has been necessary to use the oxy-acetylene welding process, but the solder of this invention can be used with an ordinary soldering iron, preferably heated as hot as possible. This present solder is compounded as follows, the ingredients being in substantially the proportions herein named:

One-half (½) pound of zinc is melted and thereupon one-half (½) pound of block tin is added thereto. The zinc and tin are thereupon thoroughly mixed by stirring or any other suitable form of agitation, the greater heat necessary for melting the zinc and, at the time of mixing the tin with the zinc still remaining in the zinc being adequate quickly to melt the tin. Two (2) drams of sal ammoniac are then added to the fluid mixture and the sal ammoniac is thereupon thoroughly mixed with the said fluid mixture by stirring it well. The mixture is then allowed to flow away from the heat or poured out and solidifies in ingot form. After this solidification the blocks or ingots are re-melted in a furnace. The fluid mixture is then poured into suitable molds in strips and allowed again to solidify.

In use it is unnecessary to employ a flux to produce a flow of this solder, which is an advantage over previous solders for aluminum.

It will be observed that the sal ammoniac is by the herein described process of compounding this article thoroughly mixed with the other ingredients of this solder and acts not only as a flux when the same is used, but one which is in intimate contact with each and every particle of the other two ingredients and that the tin which melts more easily than the zinc carries the softening effect of the heat into each and every particle of the solder because of its admixture with the zinc in the presence of heat. In this article the zinc is used for strength, the tin for its more readily fusible quality and the sal ammoniac as a flux.

In use a soldering iron will be prepared in the usual manner, by tinning the same with this solder and sal ammoniac. After the iron has been thus tinned the parts to be joined are tinned with this solder by constant rubbing with the iron without the use of sal ammoniac or acid. Thereupon, without the use of any extraneous flux or acid the heat of the soldering iron is applied in the customary method of soldering to the strip or block of this solder, which is held adjacent to the joint to be made and the union takes place.

If desired a blow-pipe or oxy-acetylene welding apparatus may be used after the parts to be joined have been tinned as above described, by the use of the iron.

The method of melting this solder at the joint is the same as practised with any other solder. An account of the ingredients of this article and the method in which they are combined together and the absence of acid or any foreign substance on the joint parts, the resultant joint is stronger than the aluminum itself.

One advantage of this solder is that it contains no lead, and therefore does not corrode.

Another advantage of this invention is that it makes possible a preparation in advance as a commercial article that can be sold as such a strip or block or other form in predetermined size, shape, quantity, etc., of a solder that can be used without a flux, which article can be put up in commercial packages and sold and shipped ready for use.

It is well known that lead will not unite with certain substances, as for instance, aluminum, but it has been found in practice that this solder can be used to prepare the surface of aluminum for union with lead where that is desired, in which use of this solder the aluminum is first tinned with this solder and thereupon ordinary soft solder can be used to form a union with the said tinned part of the aluminum article, there being no antipathy of the lead in the soft solder to union with this solder.

Having thus described this invention, I reserve to myself the benefit of changes in proportions and steps of the process, as it is evident that minor changes may be made herein without departing from the spirit of this invention or the scope of the following claim.

Claim:

The herein described solder composed of zinc and tin, the former being in the proportion of two to one, and a relatively small proportion of sal-ammoniac.

In testimony whereof I hereunto affix my signature.

JOHN J. AUBERTIN, Jr.